United States Patent
Brule et al.

(10) Patent No.: US 10,850,429 B2
(45) Date of Patent: Dec. 1, 2020

(54) PROCESS FOR DENSIFICATION OF POLY(ARYLENE ETHER KETONE) POWDERS

(71) Applicant: ARKEMA FRANCE, Colombes (FR)

(72) Inventors: Benoit Brule, Beaumont-le-roger (FR); Denis Huze, Fontaine sous Jouy (FR); Nadine Decraemer, Beaumontel (FR); Jerome Pascal, Grandchain (FR)

(73) Assignee: ARKEMA FRANCE, Colombes (FR)

( * ) Notice: Subject to any disclaimer, the term of this patent is extended or adjusted under 35 U.S.C. 154(b) by 316 days.

(21) Appl. No.: 15/523,781

(22) PCT Filed: Oct. 7, 2015

(86) PCT No.: PCT/FR2015/052698
§ 371 (c)(1),
(2) Date: May 2, 2017

(87) PCT Pub. No.: WO2016/071596
PCT Pub. Date: May 12, 2016

(65) Prior Publication Data
US 2017/0312938 A1 Nov. 2, 2017

Related U.S. Application Data

(60) Provisional application No. 62/074,338, filed on Nov. 3, 2014.

(30) Foreign Application Priority Data

Nov. 3, 2014 (FR) .................................... 14 60543

(51) Int. Cl.
*B33Y 70/00* (2020.01)
*B29C 64/314* (2017.01)
(Continued)

(52) U.S. Cl.
CPC ................ *B29B 7/005* (2013.01); *B01F 3/18* (2013.01); *B01F 7/00291* (2013.01);
(Continued)

(58) Field of Classification Search
CPC .. C08J 3/005; C08J 3/124; B29B 7/10; B29B 2009/125; B29K 2071/00; C08G 2650/40; C08G 65/40; B29C 64/153
See application file for complete search history.

(56) References Cited

U.S. PATENT DOCUMENTS

| 4,960,818 A | 10/1990 | Reilly et al. |
| 6,572,262 B1 | 6/2003 | Russel-Smith |

(Continued)

FOREIGN PATENT DOCUMENTS

| CN | 1306493 A | 8/2001 |
| CN | 1433443 A | 7/2003 |

(Continued)

OTHER PUBLICATIONS http://www.zeppelin.sg/upload/FM_brochure.pdf (Year: 2019).*
(Continued)

*Primary Examiner* — Nahida Sultana
*Assistant Examiner* — Debjani Roy
(74) *Attorney, Agent, or Firm* — Buchanan Ingersoll & Rooney P.C.

(57) ABSTRACT

Process for densification of a poly(arylene ether ketone) (PAEK) powder or of a mixture of poly(arylene ether ketone) (PAEK) powders, the process being mixing the powder or the mixture of powders, in a mixer equipped with a rotary stirrer including at least one blade, for a period of between 30 minutes and 120 minutes, preferably of between 30 and 60 minutes, at a blade-tip speed of between 30 m/s and 70 m/s, preferably of between 40 and 50 m/s.

17 Claims, 1 Drawing Sheet

(51) Int. Cl.

| | |
|---|---|
| *B29B 7/00* | (2006.01) |
| *B29B 7/10* | (2006.01) |
| *B29B 13/10* | (2006.01) |
| *B29B 7/72* | (2006.01) |
| *B29B 7/82* | (2006.01) |
| *C08G 65/40* | (2006.01) |
| *C08G 65/46* | (2006.01) |
| *B29C 64/153* | (2017.01) |
| *B01F 3/18* | (2006.01) |
| *B01F 7/00* | (2006.01) |
| *B01F 15/06* | (2006.01) |
| *C08J 3/00* | (2006.01) |
| *B29B 9/12* | (2006.01) |
| *B33Y 10/00* | (2015.01) |
| *B29K 71/00* | (2006.01) |

(52) U.S. Cl.
CPC ............... *B01F 15/06* (2013.01); *B29B 7/10* (2013.01); *B29B 7/72* (2013.01); *B29B 7/726* (2013.01); *B29B 7/82* (2013.01); *B29B 7/823* (2013.01); *B29B 13/10* (2013.01); *B29C 64/153* (2017.08); *B29C 64/314* (2017.08); *B33Y 70/00* (2014.12); *C08G 65/40* (2013.01); *C08G 65/46* (2013.01); *C08J 3/005* (2013.01); *B01F 2015/061* (2013.01); *B29B 2009/125* (2013.01); *B29K 2071/00* (2013.01); *B33Y 10/00* (2014.12); *C08G 2650/40* (2013.01); *C08J 2371/10* (2013.01)

(56) References Cited

U.S. PATENT DOCUMENTS

| | | | | |
|---|---|---|---|---|
| 7,847,057 B2* | 12/2010 | Muller | ........................ | C08J 3/12 528/502 E |
| 2005/0207931 A1 | 9/2005 | Hesse et al. | | |
| 2006/0047052 A1 | 3/2006 | Barrera et al. | | |
| 2006/0134419 A1* | 6/2006 | Monsheimer | .......... | C08G 65/40 428/402 |
| 2009/0280263 A1 | 11/2009 | Richter et al. | | |
| 2009/0295042 A1 | 12/2009 | Pfister et al. | | |
| 2010/0068330 A1 | 3/2010 | Martinoni | | |
| 2012/0070753 A1 | 3/2012 | Nakamura et al. | | |
| 2012/0114848 A1 | 5/2012 | Miller et al. | | |
| 2013/0207052 A1 | 8/2013 | Ryu et al. | | |
| 2014/0322441 A1* | 10/2014 | Mathieu | ................. | B29B 13/10 427/180 |
| 2015/0079378 A1* | 3/2015 | Garcia-Leiner | ......... | B29C 41/04 428/220 |
| 2016/0108229 A1* | 4/2016 | Decraemer | .......... | C08G 61/127 524/540 |

FOREIGN PATENT DOCUMENTS

| | | | |
|---|---|---|---|
| DE | 101 22 492 A1 | 11/2002 | |
| DE | 10 2004 062 762 A1 | 6/2006 | |
| DE | 10 2008 024288 A1 | 12/2009 | |
| DE | 10 2011 113445 A1 | 3/2013 | |
| FR | 1 354 916 A | 3/1964 | |
| JP | 2007039631 A | 2/2007 | |
| JP | 2007302824 | 11/2007 | |
| JP | 2010523364 A | 7/2010 | |
| JP | 20100066057 A | 7/2013 | |
| WO | 0000418 A1 | 1/2000 | |
| WO | WO-2012047613 A1 * | 4/2012 | ............. C08L 71/00 |
| WO | WO 2013/068686 A1 | 5/2013 | |
| WO | WO 2014/095676 A1 | 6/2014 | |

OTHER PUBLICATIONS

Office Action (The First Office Action/Comments of the Examiner) dated Sep. 4, 2018, by the Patent Office of the People's Republic of China in corresponding Chinese Patent Application No. 201580071065. 8, and an English Translation of the Office Action, (16 pages).

Office Action (Notice of Reasons for Rejection) dated Jul. 24, 2018, by the Japanese Patent Office in corresponding Japanese Patent Application No. 2017-542340, and an English Translation of the Office Action, (8 pages).

International Search Report (PCT/ISA/210) dated Feb. 18, 2016, by the European Patent Office as the International Searching Authority for International Application No. PCT/FR2015/052698.

Written Opinion (PCT/ISA/237) dated Feb. 18, 2016, by the European Patent Office as the International Searching Authority for International Application No. PCT/FR2015/052698.

\* cited by examiner

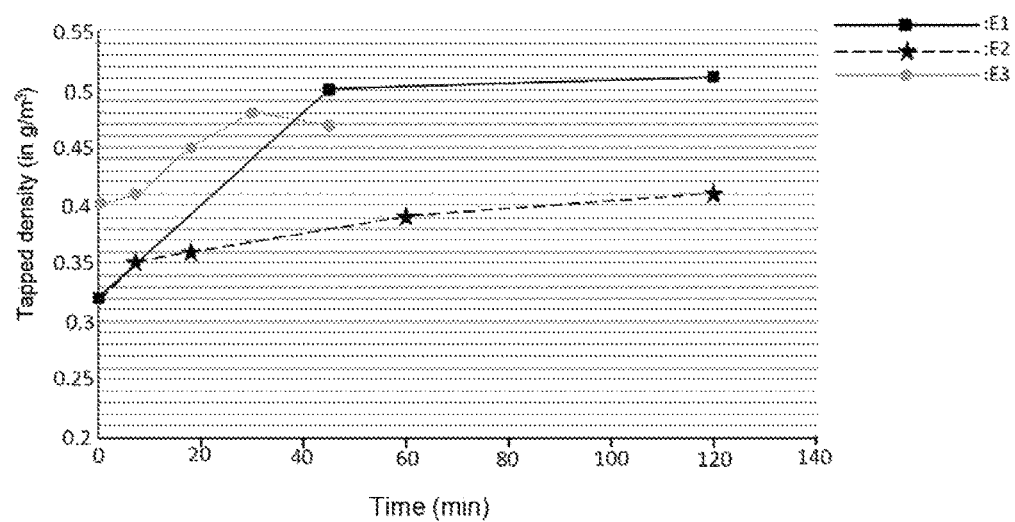

PROCESS FOR DENSIFICATION OF POLY(ARYLENE ETHER KETONE) POWDERS

FIELD OF THE INVENTION

The invention relates to the field of poly(arylene ether ketone) powders. More specifically, the invention relates to a process for densification of a powder or of a mixture of powders based on poly(arylene ether ketone)s so as to be able to use them in various applications, such as laser sintering, powder coating, transfer moulding, production of composites by dusting, or compression moulding, for example.

PRIOR ART

Poly(arylene ether ketone)s (PAEKs), and more particularly poly(ether ketone ketone)s (PEKKs), are high-performance materials with high thermomechanical properties. In the previous abbreviations, E denotes an ether function and K denotes a ketone function. In the rest of the document, these abbreviations will be used in place of customary names in order to denote the compounds to which they relate.

These polymers are used for applications with constraints in terms of temperature and/or mechanical, or even chemical, stresses. These polymers are found in fields as varied as aeronautics, off-shore drilling and medical implants. They can be processed by moulding, extrusion, compression, spinning or alternatively laser sintering. Depending on the forming process, they are used either in the form of granules or in the form of powders. In the case of the use of powders, they result from the milling of the product derived from polymerization. These powders are not very dense and have a tapped density typically of between 300 kg/m$^3$ and 400 kg/m$^3$.

In the case of certain applications, including those mentioned above, it may prove to be necessary to use PAEK powders which have a high density, greater than the density of the powder obtained after milling of the product derived from the synthesis. This is because a more dense powder implies a smaller amount of air for the same amount of powder. There is therefore less air to evacuate during processes using these powders and the obtaining of parts with no porosity is thus greatly facilitated. Furthermore, the material is in contact with a smaller amount of air, thereby limiting the risk of thermal oxidation. Finally, for some applications, such as laser sintering, the density of the powder is essential for providing a sufficient mechanical strength of the bed of powder constituting the construction tank.

Document U.S. Pat. No. 7,847,057 relates to the field of the densification of PAEK powders by means of a thermal treatment process. The treatment consists in exposing said PAEK powder to a temperature 20° C. above and preferably 50° C. above the glass transition temperature of the polymer, for a period of greater than 30 minutes and preferably for a period of greater than 1 hour. This process also results in a reduction in the specific surface area of the powder and thus in a reduction of the side reactions which can occur and in which said powder is capable of being involved. The tests described are carried out with a PEEK powder placed in a beaker or in a container made of metal. According to the experimental conditions, the gain in density of the powder can range up to 20%. Such a gain does not, however, appear to be sufficient for certain applications.

Document FR 1 354 916, filed by the applicant and not yet published, relates to a process for the thermal treatment of powders comprising PEKK which are suitable for laser sintering, and also to the powders, resulting from this process, which have good flowability. The process consists in particular of a thermal treatment at a temperature of between T+10° C. and T−10° C. where T is such that T=3.75×A+37.5; A representing the weight percentage of terephthalic units relative to the sum of the terephthalic and isophthalic units, for a period of greater than 2 minutes. Such a process makes it possible to obtain a powder which has good flowability and which is such that the weight amount of powder remaining non-sintered after production of the part by sintering is minimized. However, this treatment results in a decrease in the tapped density of the powder, i.e. in the result contrary to what it is sought to obtain.

Document WO 2014/095676 relates to a process for obtaining a powder of thermoplastic polymers offering advantages in applications of powder coating type, in particular a lower surface roughness. The process described in said document comprises 2 steps. A first step consists in compressing powder so as to form a tablet. A second step consists in milling the tablet obtained in the first step. However, the particle size distribution of the particles is very heterogeneous, even though it is a parameter that it is desirable to control throughout the polymer powder production chain and in the context of the subsequent applications. Consequently, in order to allow the obtaining of a powder with a predetermined homogeneous particle size, the process requires a third selection step, consisting in selecting, in the powder obtained, particles of a predetermined size and in removing the other particles. This process therefore appears to be fastidious, lengthy and expensive.

Furthermore, the applicant has carried out compaction and milling tests on a PEKK powder and these tests have resulted in a gain in density of 10%, i.e. the compacted and then milled powder has a tapped density 10% higher than the initial powder. This gain does not appear to be sufficient for certain applications.

The applicant has therefore sought a solution for setting up a process which makes it possible to obtain a significant increase in the density of PAEK powders. In particular, the applicant has sought a solution for obtaining a process applicable to all powders of PAEK, whether or not they have undergone prior thermal or mechanical treatments.

Technical Problem

The aim of the invention is therefore to remedy at least one of the drawbacks of the prior art. In particular, the aim of the invention is to provide a process for treating powder aimed at significantly increasing the density of poly(arylene ether ketone) (PAEK) powders, and making it possible to obtain a gain in the tapped density which is greater than 20% and preferably greater than 40% compared with the powder before treatment.

BRIEF DESCRIPTION OF THE INVENTION

To this effect, the subject of the invention is a process for densification of a PAEK powder or of a mixture of PAEK powders, characterized in that it consists in mixing the powder or the mixture of powders, in a mixer equipped with a rotary stirrer comprising at least one blade, for a period of between 30 minutes and 120 minutes, preferably of between 30 and 60 minutes, at a blade-tip speed of between 30 m/s and 70 m/s, preferably of between 40 m/s and 50 m/s.

The densification process makes it possible to obtain a significant increase in the density of the PAEK powder, or of a mixture of PAEK powders comprising PEKK, whatever the prior treatment(s) undergone by said powder, whatever its isomeric composition, and whatever the proportions of PEKK in the mixture of powders.

According to other optional characteristics of the densification process:
- the powder does not undergo any thermal regulation during the mixing;
- the mixer is thermally regulated such that the temperature is below 40° C. during all or part of the mixing;
- the powder used is a powder of poly(ether ketone ketone) (PEKK) having a weight percentage of terephthalic units, relative to the sum of the terephthalic and isophthalic units, of between 55% and 85%;
- the powder used comprises, in addition to the PEKK, a powder chosen from at least one of the following powders: PEK, PEEKEK, PEEK and PEKEKK, the PEKK powder representing more than 50% by weight, limit included;
- the PAEK powder also comprises at least one filler;
- the PAEK powder also comprises at least one additive.

The invention also relates to the use of such powders densified by means of such a process, for the production of an object by means of a technology chosen from one of the following technologies: laser sintering, powder coating, compression moulding or transfer moulding, and also to said objects produced from these powders.

BRIEF DESCRIPTION OF THE DRAWINGS

Other advantages and characteristics of the invention will emerge on reading the following description given by way of illustrative and non-limiting example, with reference to the appended FIGURE:

FIG. 1 represents a non-limiting embodiment of the present application, showing three curves indicating the change in density of three samples of powder as a function of the time of thermomechanical treatment applied to these three samples.

DESCRIPTION OF THE INVENTION

Density is defined as the ratio of the weights by volume between the material considered and that of water, and does not therefore have a unit. However, in the interests of uniformity with what is often read in the literature, density can be likened to the weight per volume and can be expressed in $kg/m^3$.

The tapped density corresponds to the ratio of the weight of a sample of powder to the volume of this sample, said sample of powder having been tapped before the volume was measured. In the case of the non-tapped density, the sample of powder is not tapped before its volume is measured.

The PAEKs used in the process which is the subject of the invention comprise especially PEKKs, in particular an isomer thereof or a mixture of the isomers thereof. However, in a more general context, it would not be possible to exclude all of the poly(arylene ether ketone)s, in particular those corresponding to the generic names PEK, PEEK, PEEKEK and PEKEKK, where E denotes an ether function and K denotes a ketone function, in particular when they are used in combination with PEKK in weight proportions where the PEKK represents more than 50% by weight proportion and preferably more than 80% by weight proportion, limits included.

Preferably, the poly(arylene ether ketone)s are poly(ether ketone ketone)s comprising a mixture of terephthalic and isophthalic units such that the weight percentage of terephthalic units, relative to the sum of the terephthalic and isophthalic units, is between 55% and 85% and preferably between 55% and 70%, ideally 60%. The term "terephthalic and isophthalic unit" is intended to mean the formula of terephthalic acid and of isophthalic acid respectively.

The PAEK powders, or mixtures of powders, used in the process which is the subject of the invention can be obtained by milling or by precipitation, for example. They can, for example, be obtained in accordance with the milling process described in particular in application FR 1 160 258. They can, where appropriate, comprise one or more additives or contain various compounds, such as fillers, in particular inorganic fillers such as carbon black, carbon or non-carbon nanotubes, milled or unmilled fibres, stabilizing agents (light-stabilizing, in particular UV-stabilizing, and heat-stabilizing), flow-facilitating agents, such as silica, or else optical brighteners, dyes or pigments, or a combination of these fillers and/or additives.

After having undergone the thermomechanical treatment process of the invention, the PAEK powder exhibits a gain in tapped density of greater than 20% and preferably greater than 40% compared with the powder before treatment.

The process for treating such powders, which makes it possible to obtain the powders of which the tapped density is significantly increased, consists in mixing the PAEK powder or the mixture of powders, in particular of PEKK, in a rapid commercial mixer, such as the rapid mixers sold by the companies Henschel, Diosna, Eirich, Lödige or Kahl, for example. Such a rapid mixer is equipped with a rotary shaft comprising at least one blade. The powder is mixed for a period of between 30 and 120 minutes, preferably of between 30 and 60 minutes, limits included, at a blade-tip speed of the mixer of between 30 m/s and 70 m/s, preferably of between 40 and 50 m/s. The mixing of the powder can be carried out with or without thermal regulation of the mixer. Such a thermal regulation can be carried out during all or part of the mixing step. It generally amounts to cooling the mixer such that the temperature during the mixing remains below 40° C. Such a thermal regulation of the mixer makes it possible to obtain an improved density, with a gain in tapped density of between 20% and 30% compared with the initial powder.

Without thermal regulation, the temperature of the powder increases during the mixing step owing to the friction between the powder and the mixer. The mechanical treatment applied to the powder therefore makes it possible to raise its temperature to a temperature of generally between 80 and 100° C. Such a temperature is below the glass transition temperature of the PEKK used, and below the lowest glass transition temperature among the poly(arylene ether ketone)s used, in the case of a mixture of polymers. Indeed, the glass transition temperature of poly(arylene ether ketone)s is generally between 130° C. and 190° C. This heating temperature is also well below the thermal treatment described in document U.S. Pat. No. 7,847,057, the temperature of which is at least 20° C. above the glass transition temperature. The synergy between the mechanical treatment and the thermal heating of the powder makes it possible to obtain a significantly increased densification of the powder, with a greater than 50% gain in tapped density compared with the initial powder.

The powder obtained has a significantly higher density than the starting powder. The gain in density obtained is different depending on whether or not the mixer is temperature-regulated, and is generally between 20% and 60%. Typically, the gain in density obtained with cooling of the mixer is greater than or equal to 20%, whereas, without cooling of the mixer, it is greater than or equal to 50%.

The process according to the invention therefore makes it possible to obtain, in particular, PAEK powders which have a density significantly higher than the initial powders. An advantage of this densification process is that it comprises only one step, and allows rapid treatment of the powders. The process is also simple to carry out and is applicable to all PAEK powders having undergone or not undergone prior thermal or mechanical treatments. The thermomechanical stresses applied thus make it possible to obtain powders with a very high density compared with the initial powders. A large gain in density has in particular the following advantages: for the same amount of powder, the amount of air to be eliminated is smaller so that the obtaining of objects with no porosity is thereby facilitated. Owing to this smaller amount of air, the risk of thermal oxidation is also limited. Furthermore, a powder with a significantly improved density contributes to improving the strength of the bed of powder in laser sintering. Finally, the transportation and handling of the powder are thereby facilitated.

The following examples illustrate in a non-limiting manner the scope of the invention:

Example 1: Density Measurement

The tapped density and non-tapped density are measured according to ISO standard 1068-1975 (F) in the following way:
- introduce a volume of powder into a graduated 250 ml glass measuring cylinder;
- level, if necessary, the free surface of the powder without tapping it and note the volume V0;
- weigh the cylinder with the powder with a 0.1 g precision balance which has been tared beforehand;
- place the cylinder on the plate of the tapping apparatus of the STAV 2003 type;
- tap with 1250 drops, note the volume V1;
- tap with 1250 drops, note the volume V2;
- repeat the tapping operation until two equivalent volumes Vi are obtained. Note Vf corresponding to the identical volumes Vi.

The non-tapped density is the weight of product introduced divided by V0. The tapped density is the weight of powder introduced divided by Vf. The tapped and non-tapped densities are both expressed in kg/m$^3$.

Example 2: Densification of a PEKK Powder by Means of the Process which is the Subject of the Invention A PEKK powder sold under the reference KEPSTAN 6002 by the company Arkema, containing 60% of terephthalic units relative to the sum of the terephthalic and isophthalic units, the particle size of which has a dv50 of 50 μm plus or minus 5 μm, and the tapped density of which is 320 kg/m$^3$, is subjected to various thermomechanical treatments in a Henschel rapid mixer, the blade-tip speed of which is about 43 m/s.

The Dv50, or median volume diameter, corresponds to the value of the particle size which divides the particle population examined exactly in two. The Dv50 is measured according to standard ISO9276—parts 1 to 6. In the present description, a Malvern Mastersizer 2000 particle size analyser is used, and the measurement is carried out via the liquid process by powder laser diffraction.

Three samples of powder are compared with the initial powder. The curve of density, as a function of the thermomechanical treatment and of time, obtained for these three samples is represented in FIG. 1 and the results obtained are collated in Table I below.

TABLE I

| | Treatment time (min) | Tapped density (in kg/m$^3$) | Gain in density |
|---|---|---|---|
| Initial powder | | 320 | |
| E1: Henschel, without cooling | 45 | 500 | 56% |
| E2: Henschel, with cooling | 60 | 390 | 22% |
| E3: E2 in Henschel, without cooling | 30 | 480 | 50% |

A first sample of powder, referenced E1, the curve of which is represented as a continuous black line in FIG. 1, was mixed in the rapid mixer without thermal regulation, i.e. without cooling. The gain in tapped density is 56% compared with the initial powder after 45 minutes.

A second sample of powder, referenced E2, the curve of which is represented as discontinuous lines in FIG. 1, was mixed in the rapid mixer with thermal regulation, i.e. with cooling to an ambient temperature of about 25° C. In this case, the gain in tapped density is 22% compared with the initial powder after 60 minutes and increases further as a function of the mixing time, to reach 28% after 120 minutes of mixing.

A third sample of powder, referenced E3, the curve of which is represented as a grey continuous line in FIG. 1, corresponding to the powder of the sample E2 obtained after thermally regulated mechanical treatment, was mixed in the rapid mixer without thermal regulation. The gain in tapped density is 50% compared with the initial powder after 30 minutes, and 23% compared with the powder of the second sample E2 mixed with thermal regulation.

These examples demonstrate that the densification is strongly influenced not only by the mechanical stress applied to the powder, but also by the temperature, even if the latter remains modest compared with the heat treatments carried out thus far on the powders.

The invention claimed is:
1. A process for densification of a poly(arylene ether ketone) (PAEK) powder or of a mixture of poly(arylene ether ketone) (PAEK) powders,
   the process consisting of: mixing the powder or the mixture of powders in a mixer equipped with a rotary stirrer comprising at least one blade, for a period of between 30 minutes and 120 minutes, at a blade-tip speed of between 30 m/s and 70 m/s to form a densified powder or mixture of powders;
   wherein during mixing, the powder or mixture of powders reaches a temperature below the glass transition temperature of the powder or below the lowest glass transition temperature among the powders in the mixture and
   wherein the densified powder or mixture of powders achieves a gain in tapped density which is greater than 20% compared with the powder or mixture of powders before densification.

2. The process for densification according to claim 1, wherein the mixer is thermally regulated such that the temperature is below 40° C. for all or part of the mixing.

3. The process for densification according to claim 1, wherein the powder or mixture of powders is comprised of a powder of poly(ether ketone ketone) (PEKK) having a weight percentage of terephthalic units, relative to the sum of the terephthalic and isophthalic units, of between 55% and 85%.

4. The process for densification according to claim 3, wherein the powder or mixture of powders used comprises, in addition to the PEKK, a powder chosen from at least one of the following powders: PEK, PEEKEK, PEEK and PEKEKK, the PEKK powder representing more than 50% by weight, limit included.

5. The process for densification according to claim 1, wherein the PAEK powder or mixture of powders also comprises at least one filler.

6. The process for densification according to claim 1, wherein the PAEK powder or mixture of powders also comprises at least one additive.

7. The process for densification according to claim 1, wherein the period of mixing is between 30 minutes and 60 minutes.

8. The process for densification according to claim 1, wherein the blade-tip speed is between 40 m/s and 50 m/s.

9. The process for densification according to claim 1, wherein the process for densification results in a gain in the tapped density of the densified powder or mixture of powders which is greater than 40% compared with the powder or mixture of powders before densification.

10. The process for densification according to claim 1, wherein the mixing of the powder or mixture of powders is carried out with thermal regulation of the mixer.

11. The process for densification according to claim 10, wherein the mixer is cooled such that the temperature during the mixing remains below 40° C.

12. The process for densification according to claim 1, wherein the mixing of the powder or mixture of powders is carried out without thermal regulation of the mixer.

13. The process for densification according to claim 12, wherein mechanical treatment applied to the powder or mixture of powders raises the temperature of the powder or mixture of powders to a temperature between 80° C. and 100° C.

14. The process for densification according to claim 13, wherein the process for densification results in a gain in the tapped density of the densified powder or mixture of powders which is greater than 50% compared with the powder or mixture of powders before densification.

15. The process for densification according to claim 1, wherein the densified powder or mixture of powders have substantially the same median volume diameter, Dv50, as measured according to standard ISO9276-parts 1 to 6, as the powder or mixture of powders before densification.

16. A process for densification of a poly(arylene ether ketone) (PAEK) powder or of a mixture of poly(arylene ether ketone) (PAEK) powders,
the process consisting of mixing the powder or the mixture of powders to form a densified powder or mixture of powders,
wherein during mixing, the powder or mixture of powders reaches a temperature below the glass transition temperature of the powder or below the lowest glass transition temperature among the powders in the mixture, and
wherein the densified powder or mixture of powders achieve a gain in tapped density which is greater than 20% compared with the powder or mixture of powders before densification.

17. The densification process according to claim 16, wherein mixing occurs for a period of time between 30 minutes and 120 minutes.

* * * * *